United States Patent
Enomoto et al.

(10) Patent No.: US 6,340,200 B1
(45) Date of Patent: Jan. 22, 2002

(54) FRONT PILLAR IMPACT ABSORBING STRUCTURE

(75) Inventors: Kouji Enomoto; Suguru Yoshida, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/711,535

(22) Filed: Nov. 14, 2000

(30) Foreign Application Priority Data

Nov. 19, 1999 (JP) .......................................... 11-329322

(51) Int. Cl.$^7$ .................................................. B60J 7/00
(52) U.S. Cl. .................. 296/189; 296/194; 296/203.02; 296/96.21; 296/84.1
(58) Field of Search .............................. 296/189, 194, 296/203.02, 96.21, 84.1

(56) References Cited

U.S. PATENT DOCUMENTS

| | | | | |
|---|---|---|---|---|
| 5,163,730 A | * | 11/1992 | Welch ........................ | 296/189 |
| 5,472,258 A | * | 12/1995 | Meguro et al. ........... | 296/146.9 |
| 5,544,933 A | * | 8/1996 | Shahab et al. ............. | 296/189 |
| 5,575,500 A | * | 11/1996 | Mimura et al. ............ | 296/189 |
| 5,580,116 A | * | 12/1996 | Patel et al. ................. | 296/189 |
| 5,775,768 A | * | 7/1998 | Yamane .................... | 296/146.9 |
| 5,803,532 A | * | 9/1998 | Karuppaswamy et al. .. | 296/189 |
| 5,868,458 A | * | 2/1999 | Hirata et al. ................ | 296/189 |
| 5,988,733 A | * | 11/1999 | Kamo et al. ................ | 296/189 |
| 5,992,924 A | * | 11/1999 | Norotake et al. ........... | 296/189 |
| 6,142,506 A | * | 11/2000 | Patel et al. ................. | 296/189 |
| 6,173,990 B1 | * | 1/2001 | Nakajima et al. ........... | 296/214 |
| 6,179,359 B1 | * | 1/2001 | Clauson et al. ............. | 296/39.1 |

FOREIGN PATENT DOCUMENTS

JP          9-39833          2/1997

* cited by examiner

Primary Examiner—Joseph D. Pape
Assistant Examiner—Kiran B. Patel
(74) Attorney, Agent, or Firm—Arent Fox Kintner Plotkin & Kahn, PLLC (57) ABSTRACT

A pillar outer of a front pillar of an automotive vehicle comprises a stiffener and a flange portion connecting to a pillar inner. A peripheral portion of a windshield is fixed to a front face (a face orienting outwardly of the vehicle) of the flange portion via a plastically deformable member which can be deformed easily and plastically when a load is applied thereto in a longitudinal direction of the vehicle body. When an impact generated when an obstacle comes to interfere with the windshield is transmitted to the plastically deformable member, the plastically deformable member is easily press collapsed by the load, and the impact that is to be received by the windshield and the obstacle can be absorbed through the impact absorbing action. In addition, since the front face of the peripheral portion of the windshield is disposed flush with an outer wall portion of the pillar outer, a connecting portion between the two members is made flush with those members to thereby reduce the air drag thereat.

6 Claims, 7 Drawing Sheets

FRONT PILLAR IMPACT ABSORBING STRUCTURE

BACKGROUND OF THE INVENTION

1. Field of the Invention

The present invention relates to a front pillar impact absorbing structure in which an impact applied to the windshield of an automotive vehicle is designed to be absorbed by a front pillar.

2. Description of the Related Art

Known in JP-A-9-39833 is a front pillar impact absorbing structure in which a metallic impact absorbing panel having a closed cross section is disposed along a front face of each of front pillars of an automotive vehicle so as to absorb an impact that is to be received by both the front pillar and an external obstacle when an impact is applied to the front pillar from the front of the automotive vehicle through an interference of the external obstacle with the front pillar, and a resin cover member is fixed to a front face of the impact absorbing panel. According to the above construction, when the obstacle comes to interfere with the cover member on the front face of the front pillar of the automotive vehicle, the impact absorbing panel is collapsed by the impact applied from the obstacle to the front pillar via the cover member to thereby absorb the impact that is to be received by the front pillar and the obstacle.

With the aforesaid front pillar impact absorbing structure, the construction becomes effective when the obstacle interferes directly with the front pillar, but when the obstacle first interferes with the windshield and an impact generated then is transmitted to the front pillars from peripheral portions of the windshield, the front pillar impact absorbing structure has faced a drawback that the impact so generated cannot be absorbed effectively. Additionally, since the impact absorbing panel protrudes forward from the front face of the windshield, there has also been caused a drawback that the effort to have a flush surface construction at the windshield of the automotive vehicle to reduce the air drag is thus disturbed.

SUMMARY OF THE INVENTION

The invention was made in view of the above situations, and an object thereof is to provide a front pillar impact absorbing structure that can not only effectively absorb an impact generated when an obstacle comes to interfere with the windshield of an automotive vehicle by a front pillar or pillars of the automotive vehicle but also reduce the air drag at the front pillars.

With a view to attaining the aforesaid object, according to a first aspect of the invention, there is proposed a front pillar impact absorbing structure wherein an impact applied to a windshield is absorbed by a front pillar or pillars, characterized in that the front pillar is constructed by connecting a flange portion of a pillar outer to a pillar inner on a passenger compartment side of a peripheral portion of the windshield, and that the peripheral portion of the windshield is supported on a front face of the flange portion via a plastically deformable member.

According to the above construction, when the impact generated when an obstacle comes to interfere with the windshield is transmitted to the plastically deformable members from the peripheral portions of the windshield, the plastically deformable members compressed between the windshield and the flange portions of the pillar outers are press collapsed in the longitudinal direction of the vehicle body, and the impact that is to be received by the front pillars and the obstacle is absorbed through the impact absorbing action.

Additionally, according to a second aspect of the invention, there is proposed a front pillar impact absorbing structure as set forth the first aspect, wherein the flange portion is located at a position receding from an outer wall portion of the pillar outer, and a front face of the peripheral portion of the windshield is disposed such that the front face of the peripheral portion is flush with the outer wall portion of the pillar outer.

According to the above construction, since the front faces of the peripheral portions of the windshield are disposed flush with the outer wall portions of the pillar outers by providing the flange portions at the positions receding from the outer wall portions of the pillar outers, connecting portions between the front pillars and the windshield are made flush with the respective components to thereby reduce the air drag at the connecting portions.

Additionally, according to a third aspect of the invention, there is proposed a front pillar impact absorbing structure as set forth in the first or second aspect, wherein the peripheral portion of the windshield is fitted and held in a slit formed in a side of the plastically deformable member and wherein a gap between the peripheral portion of the windshield and the pillar outer is covered with a molding which is integrally continuous with an outer side of said slit.

According to the above construction, since the peripheral portions of the windshield are fitted and held in the slits of the plastically deformable members and the gaps between the peripheral portions of the windshield and the pillar outers are covered with the moldings which are integrally continuous with the outer sides of the slits, not only can the positioning and holding of the windshield be facilitated but also the number of components and man hours for assembly can be reduced.

DETAILED DESCRIPTION OF THE PREFERRED EMBODIMENTS

A mode for carrying out the invention will be described below based on embodiments according to the invention which are shown in the accompanying drawings.

Figure 1:
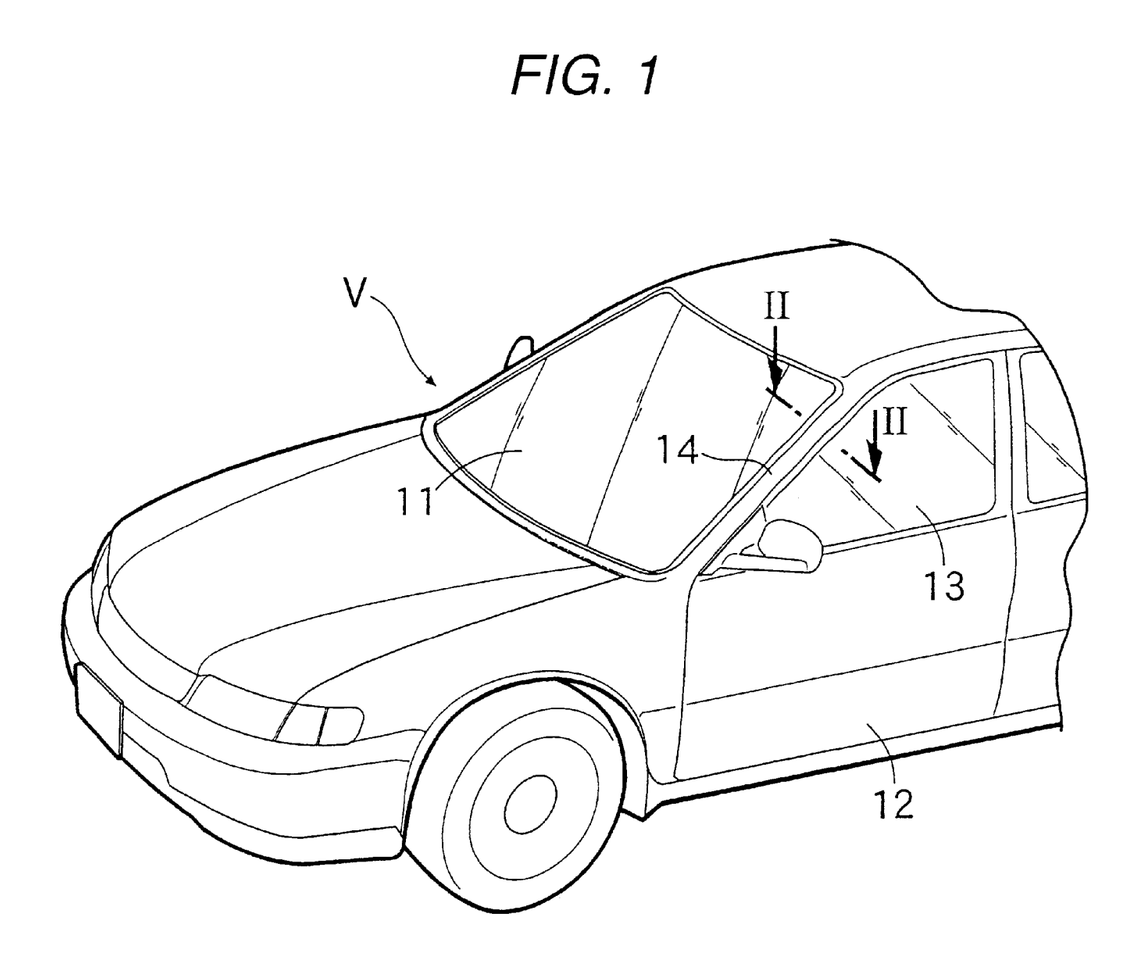
FIG. 1 is a perspective view of a front part of an automotive vehicle.
Figure 2:
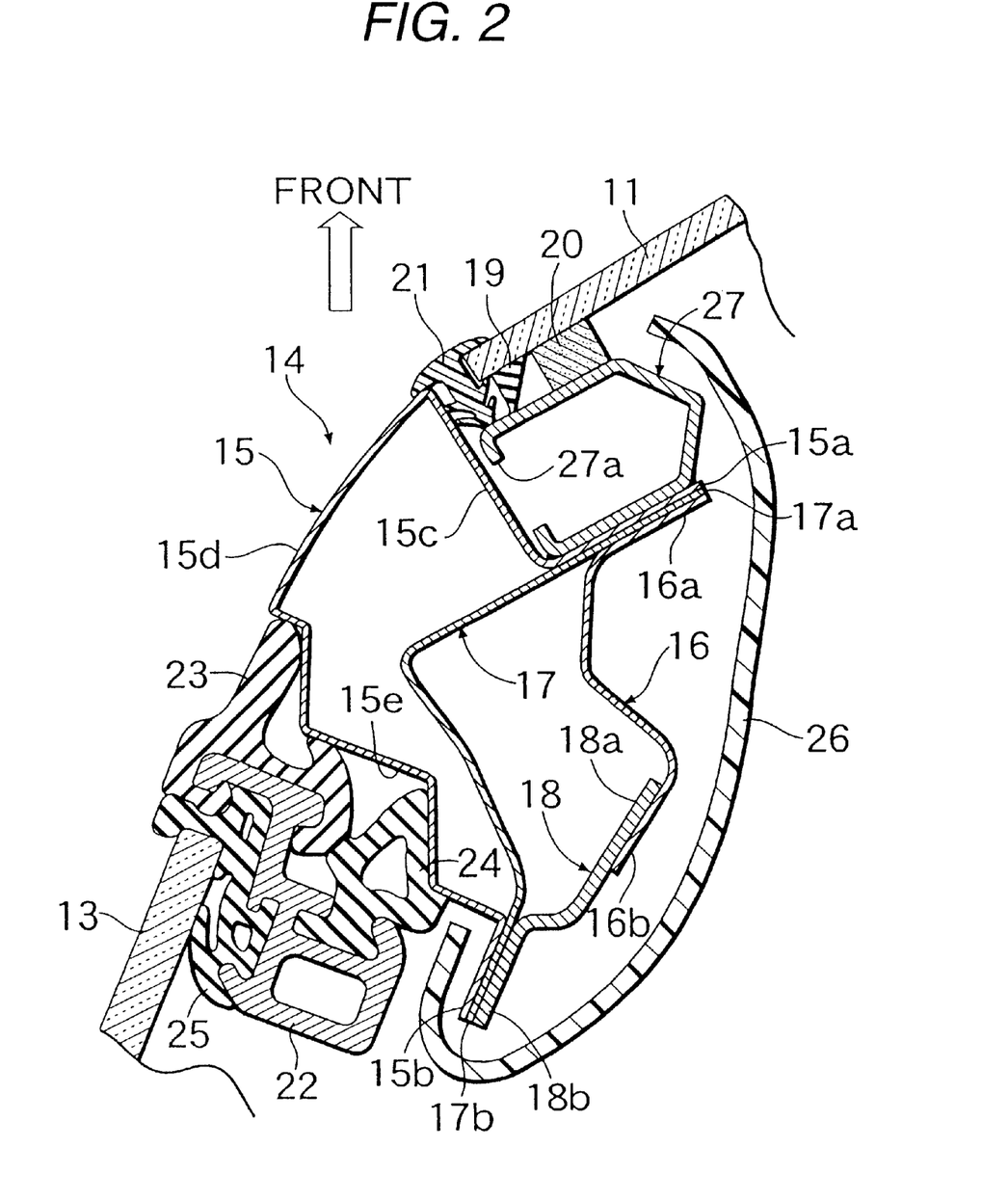
FIG. 2 is an enlarged cross sectional view taken along the line 2—2 in FIG. 1.
Figure 3:
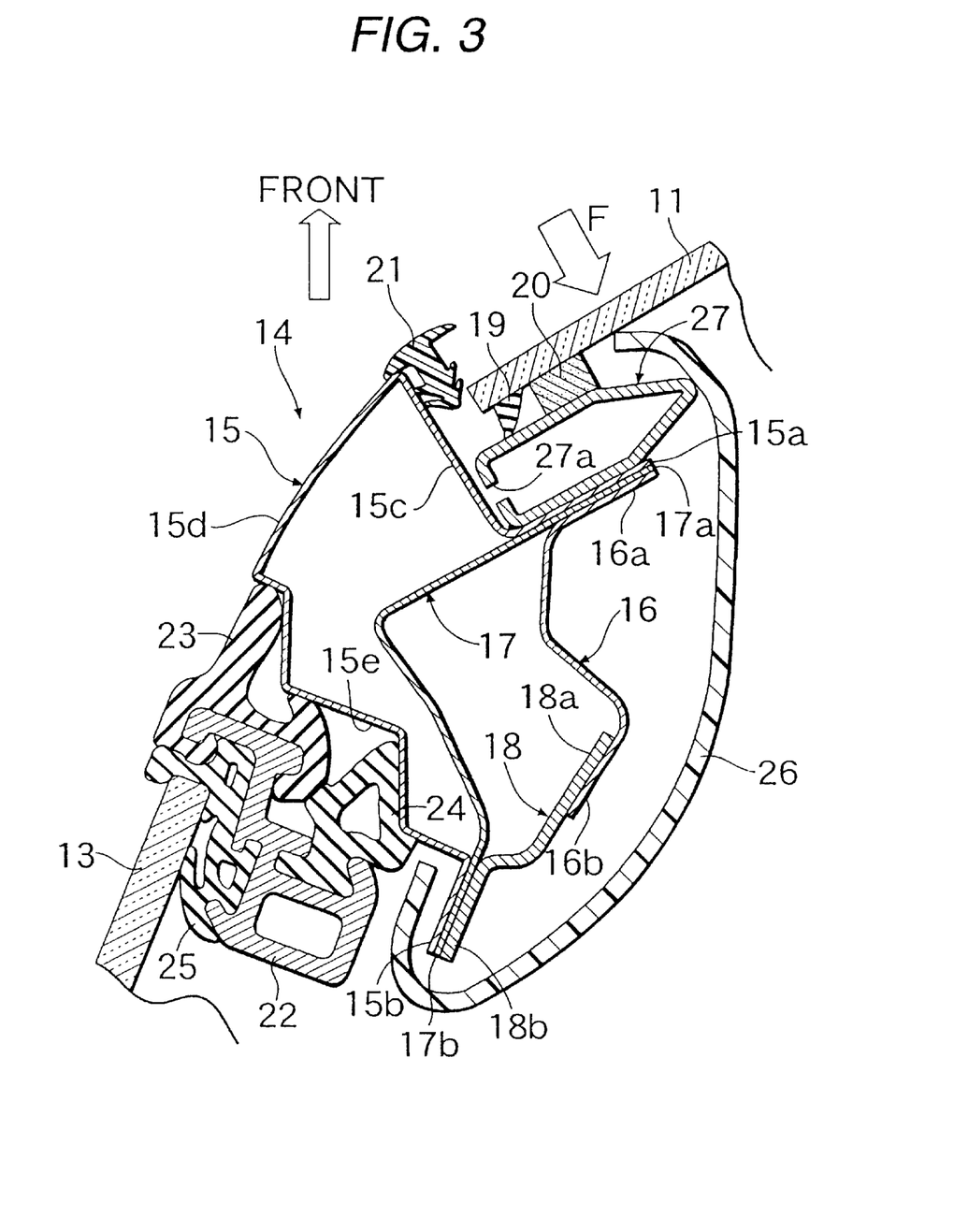
FIG. 3 is an explanatory view for explaining an operation of a first embodiment according to the invention when an obstacle comes to interfere with a windshield.

FIGS. 1 to 3 show a first embodiment of the invention, in which FIG. 1 is a perspective view of a front part of an automotive vehicle, FIG. 2 is an enlarged cross sectional view taken along the line 2—2 in FIG. 1, and FIG. 3 is an explanatory view for explaining an operation of the embodiment when an obstacle interferes with the windshield of the automotive vehicle.

As shown in FIG. 1, a front pillar 14 is provided between a side edge of a windshield 11 of an automotive vehicle V and a front edge of a window glass 13 of a front door 12, and the front pillar 14 inclines in the longitudinally rearward direction of the vehicle body at an upper end thereof.

As is clear from FIG. 2, the front pillar 14 is constituted by connecting four sheet members such as a pillar outer 15, a pillar inner 16, a stiffener 17 and a reinforcement 18, which then forms a closed cross section. The pillar outer 15 located on the external side of the vehicle body is a member having a groove-like cross section, and a pair of flange portions 15a, 15b located on sides of the groove-like cross section are welded to a pair of side edge portions 17a, 17b located on sides of an L-shaped cross section of the stiffener 17. Thus, the pillar outer 15 and the stiffener 17 constitute a closed cross section.

The pillar inner 16 is a member having an S-shaped cross section, and a side edge portion 16a located on one side of the S-shaped cross section is welded to the side edge portion 17a located on one of the sides of the stiffener 17. The reinforcement 18 is a member having a flat plate-like cross section, and a side edge portion 18a located on one side of the cross section is welded to a side edge portion 16b located on the other side of the pillar inner 16, a side edge portion 18b located on the other side of the cross section is welded to the side edge portion 17b located on the other side of the stiffener 17. Accordingly, the stiffener 17, the pillar inner 16 and the reinforcement 18 constitute another closed cross section.

An erect wall portion 15c extends forward (outwardly of the vehicle) from the flange portion 15a, which is one of the flange portions of the pillar outer 15 and is located rearward of (on the passenger compartment side of the vehicle) a peripheral portion of the windshield 11, and a front side of the erect wall portion 15c connects to an outer wall portion 15d which is exposed to the exterior of the vehicle body. A rear face of a plastically deformable member 27 which is formed of a metal plate so as to have a C-shaped cross section is welded to a front face of the flange portion 15a of the pillar outer 15 in such a manner that an opening 27a of the C-shaped cross section confronts the erect wall portion 15c. Then, the peripheral portion of the windshield 11 is fixed to a front surface of the plastically deformable member 27 via a dam rubber 19 and a sealant 20. A molding 21 is attached in a gap between the peripheral portion of the windshield 11 and the erect wall portion 15c of the pillar outer 15. In this state, the front face of the peripheral portion of the windshield 11 and the outer wall portion 15d of the pillar outer 15 are disposed flush with each other.

Note that the rear face of the plastically deformable member 27 may be bonded to the front face of the flange portion 15a of the pillar outer 15 with an adhesive, instead of being welded to the flange portion 15a, whereby the plastically deformable member 27 may elastically be supported on the flange portion 15.

An exterior door weather strip 23 mounted on a door pillar 22 of a front door 12 abuts against the outer wall portion 15d of the pillar outer 15, and the exterior door weather strip 23 and an interior door weather strip 24 also mounted on the door pillar 22 abut against a step-like seal wall portion 15e connecting to the flange portion 15b. Additionally, a window weather strip 25 mounted on the door pillar 22 abuts against a windowpane 13. Then, a side face of the front pillar 14 on the passenger compartment side is covered with a garnish 26.

Next, a function of the embodiment of the invention which is constructed as described above will be described below.

As shown in FIG. 3, when an obstacle comes to interfere with the front face of the windshield 11, applying an impact to the windshield 11 in a direction designated by an arrow F, a load generated by the impact is directly transmitted to the plastically deformable member 27 from the peripheral portion of the windshield 11, and this compresses the plastically deformable member 27, which is then plastically deformed to be collapsed in a longitudinal direction, the impact energy being thereby absorbed. Thus, the impact that is to be received by both the front pillar 14 and the obstacle can effectively absorbed when the plastically deformable member is press collapsed. Moreover, since the front face of the peripheral portion of the windshield 11 is disposed flush with the outer wall portion 15d of the pillar outer 15, the pillar outer 15 can be made flush with the windshield 11, which contributes to the reduction of the air drag occurring thereat.

Figure 4:
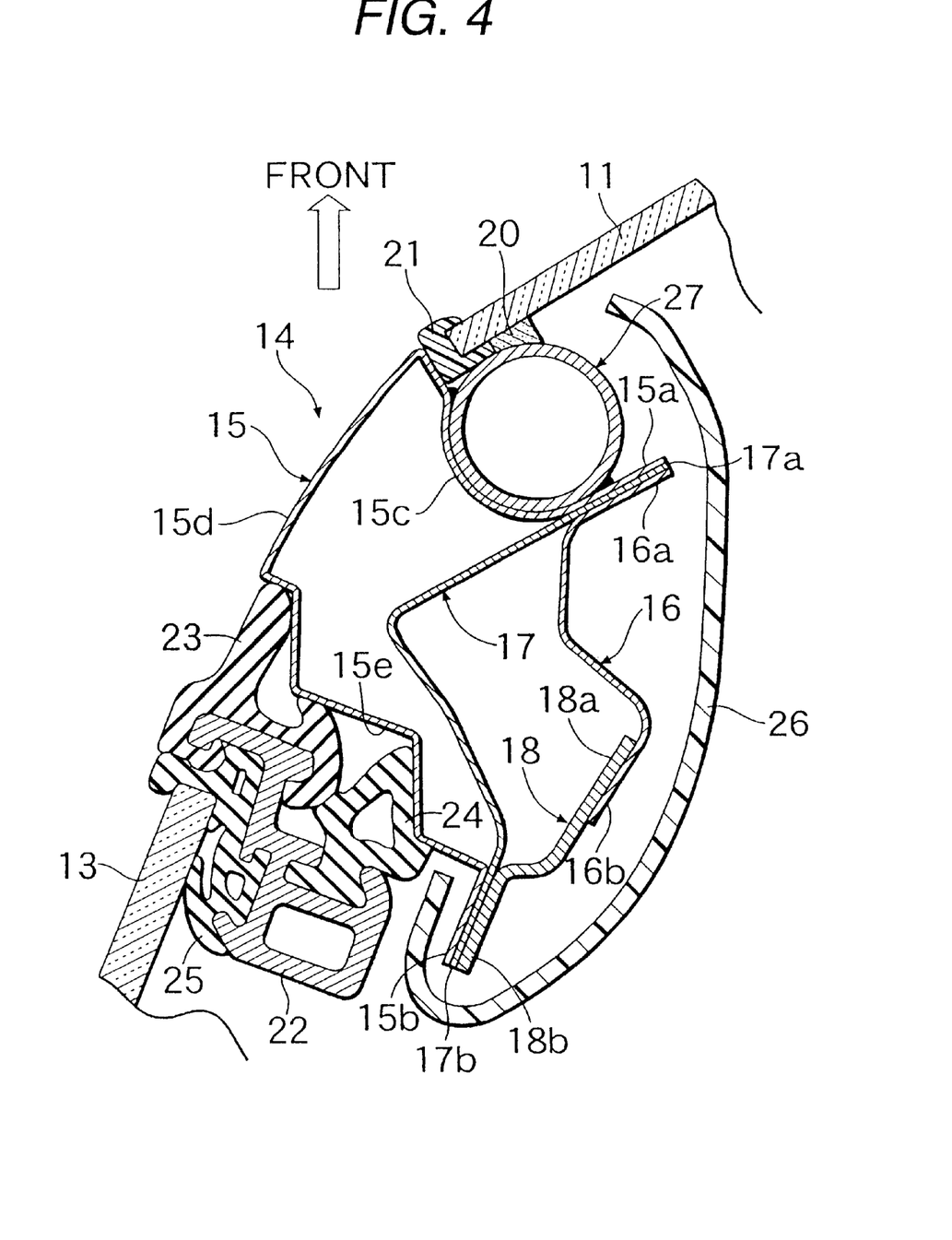
FIG. 4 is a view showing a second embodiment according to the invention, which corresponds to FIG. 2.

FIG. 4 shows a second embodiment according to the invention in which the plastically deformable member 27 is constituted by an aluminum pipe member having a circular cross section. This plastically deformable member 27 is fixed to the front face of the flange portion 15a of the pillar outer 15 through welding and to a rear face of the peripheral portion of the windshield with the sealant 20.

Figure 5:
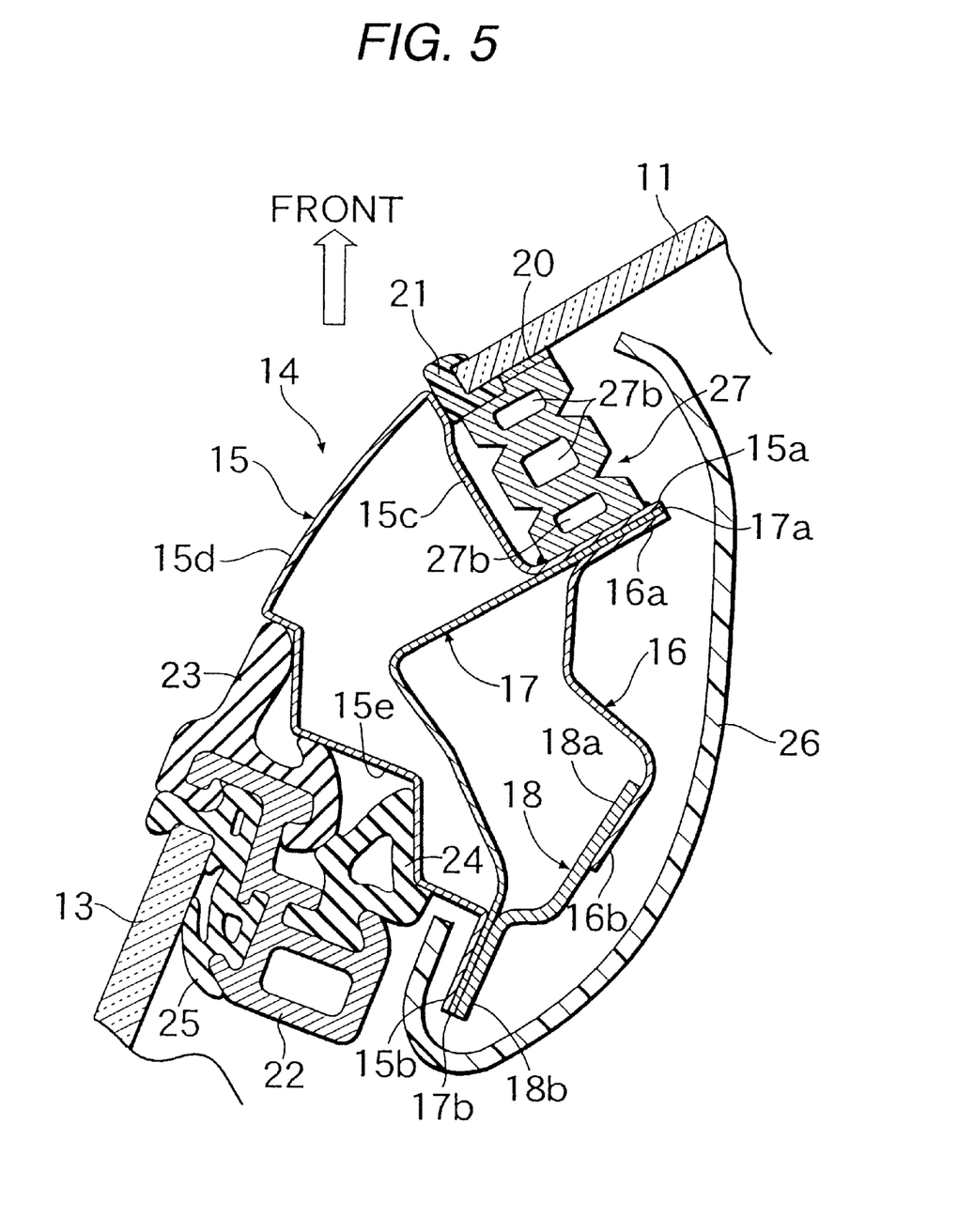
FIG. 5 is a view showing a third embodiment according to the invention, which corresponds to FIG. 2.

FIG. 5 shows a third embodiment according to the invention, in which the plastically deformable member 27 is constituted by an extruded aluminum member. This plastically deformable member 27 is fixed to the front face of the flange portion 15a of the pillar outer 15 through welding and to a rear face of the peripheral portion of the windshield with the sealant. A plurality of spaces 27b are formed in the interior of the plastically deformable member 27 so that the same member 27 is allowed to buckle.

Figure 6:
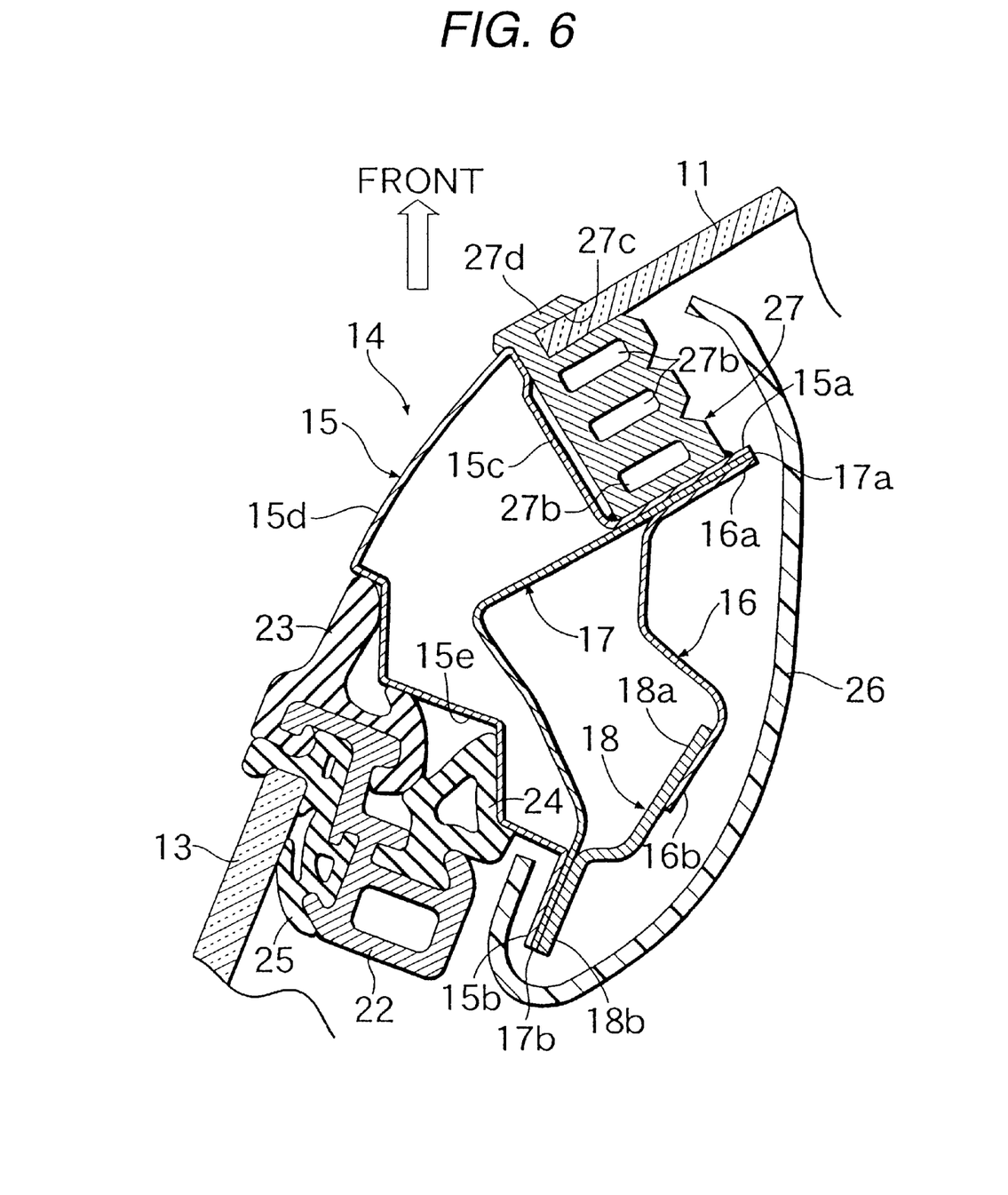
FIG. 6 is a view showing a fourth embodiment according to the invention, which corresponds to FIG. 2.

FIG. 6 shows a fourth embodiment according to the invention, which is a modification to the third embodiment. In this embodiment, a slit 27 is formed in a side of the front portion of the plastically deformable member 27 which is constituted by the extruded aluminum member so that the peripheral portion of the windshield 11 is fitted and held therein. A molding 27d is formed integrally with the front face of the plastically deformable member 27 so that a gap between the peripheral portion of the windshield 11 and the outer wall portion 15d of the pillar outer 15 is covered therewith.

The function and effectiveness provided by the first embodiment can be attained even with the aforesaid second to fourth embodiments of the invention. In particular, according to the fourth embodiment, the positioning and holding of the windshield 11 can be facilitated by allowing the peripheral portion of the windshield 11 to be fitted and held in the slit 27c in the plastically deformable member 27. Moreover, since the molding 27d for covering the gap between the peripheral portion of the windshield 11 and the outer wall portion 15d of the pillar outer 15 is formed integrally with the plastically deformable member 27, the number of components and man hours for assembly can be reduced when compared with a case where a separate molding is used.

Thus, while the embodiments of the invention have been described in detail, various changes in design may be made without departing from the sprit of the invention.

For example, the construction of the plastically deformable member 27 is not limited to those described in the first to fourth embodiments above, but it may adopt any construction, provided that the plastically deformable member can plastically be deformed when it receives a load from the windshield.

Figure 7:
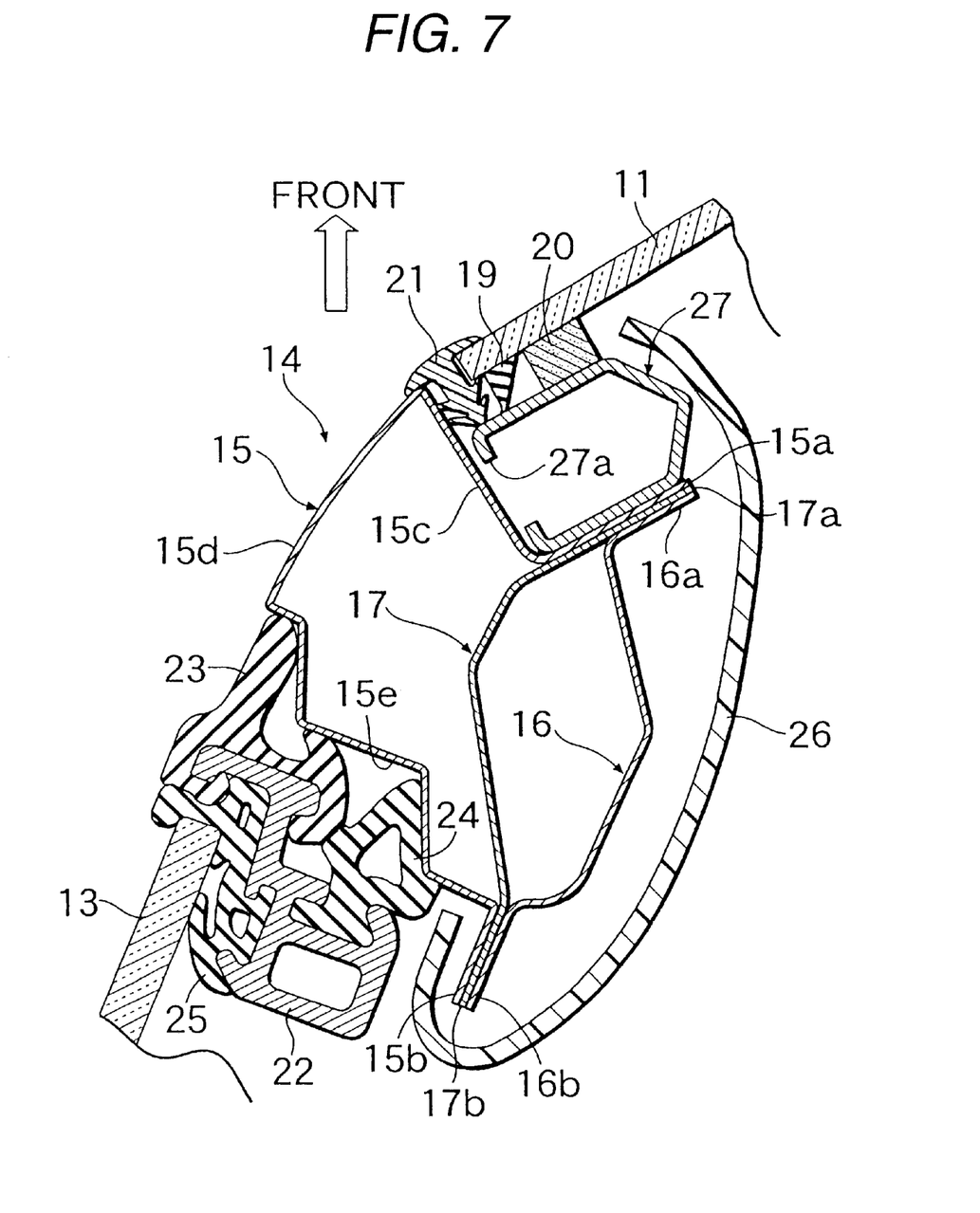
FIG. 7 is a view showing a fifth embodiment according to the invention, which corresponds to FIG. 2.

Additionally, in the embodiments, the front pillar 14 comprises the four members such as the pillar outer 15, the pillar inner 16, the stiffener 17 and the reinforcement 18, but the stiffener 17 and the reinforcement 18 are not necessarily provided. It would be good enough if the pillar outer 15 and the pillar inner 16 are provided. In a fifth embodiment shown in FIG. 7, no reinforcement 18 is provided on the front pillar 14, which is constituted only by three members such as a pillar outer 15, a pillar inner 16 and a stiffener 17.

As has been described heretofore, according to the first aspect of the invention, when the impact generated by the obstacle which comes to interfere with the windshield is transmitted to the plastically deformable member from the peripheral portion of the windshield, the plastically deformable member which is compressed between the peripheral portion of the windshield and the flange portion of the outer pillar is press collapsed in the longitudinal direction of the vehicle body, and through this impact absorbing action of the member the impact that is to be received by the windshield and the obstacle can be absorbed.

In addition, according to the second aspect of the invention, since the front face of the peripheral portion of the windshield is disposed flush with the outer wall portion of the pillar outer by providing the flange portion at the position receding from the outer wall portion of the pillar outer, the connecting portion between the front pillar and the windshield is made flush with those components to thereby reduce the air drag thereat.

Additionally, according to the third aspect of the invention, since the peripheral portion of the windshield is fitted and held in the slit in the plastically deformable member and the gap between the peripheral portion of the windshield and the pillar outer is covered with the molding which is integrally continuous with the exterior side of the slit, not only can the positioning and holding of the windshield be facilitated, but also the number of components and man hours or assembly can be reduced when compared with a case where separate molding is provided.

What is claimed is:

1. A front pillar impact absorbing assembly for absorbing an impact applied to a windshield by a front pillar, comprising:

a pillar outer having a flange portion connected with a pillar inner on a passenger compartment side of a peripheral portion of said windshield; and a plastic deformable member disposed on a front face of said flange portion such as to support said peripheral portion of said windshield, wherein said plastic deformable member has a cross section defining a space inside thereof.

2. The front pillar impact absorbing assembly according to claim 1, wherein said flange portion is located at a position receding from an outer wall portion of said pillar outer, and a front face of said peripheral portion of said windshield is disposed such that the front face of said peripheral portion is flush with said outer wall portion of said pillar outer.

3. The front pillar impact absorbing assembly according to claim 1, wherein said plastically deformable member is formed with a slit in a side thereof for fitting and holding said peripheral portion of said windshield, and wherein a molding for covering a gap between said peripheral portion of said windshield and said pillar outer is integrally connected with an outer side of said slit.

4. A front pillar impact absorbing assembly for absorbing an impact applied to a windshield by a front pillar, comprising:

a pillar inner;

a pillar outer having an outer wall portion and defining a closed cross section in conjunction with said pillar inner;

a stiffener disposed within said closed cross section; and a plastic deformable member disposed on a connecting portion connecting at least two of said pillar inner, said pillar outer and said stiffener on a passenger compartment side of a peripheral portion of said windshield such as to support said peripheral portion of said windshield, wherein said plastic deformable member has a cross section defining a space inside thereof.

5. The front pillar impact absorbing assembly according to claim 4, wherein said connecting portion is constructed by a flange portion of said pillar outer connecting with said pillar inner.

6. The front pillar impact absorbing assembly according to claim 5, wherein said pillar outer includes another flange portion connecting with a first end of a reinforcement, a second end of said reinforcement being connected to an end of said pillar inner.

* * * * *